No. 676,846. Patented June 18, 1901.
T. W. MORAN.
SWIVEL PIPE JOINT.
(Application filed Oct. 25, 1900.)
(No Model.)

Witnesses
Edwin G. McKee
George W. Anderson

Inventor
Thos. W. Moran
by E. W. Anderson
Attorney

UNITED STATES PATENT OFFICE.

THOMAS W. MORAN, OF LOUISVILLE, KENTUCKY, ASSIGNOR TO THE MORAN FLEXIBLE STEAM JOINT COMPANY, OF SAME PLACE.

SWIVEL PIPE-JOINT.

SPECIFICATION forming part of Letters Patent No. 676,846, dated June 18, 1901.

Application filed October 25, 1900. Serial No. 34,323. (No model.)

*To all whom it may concern:*

Be it known that I, THOMAS W. MORAN, a citizen of the United States, and a resident of Louisville, in the county of Jefferson and State of Kentucky, have made a certain new and useful Invention in Swivel Pipe-Joints; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
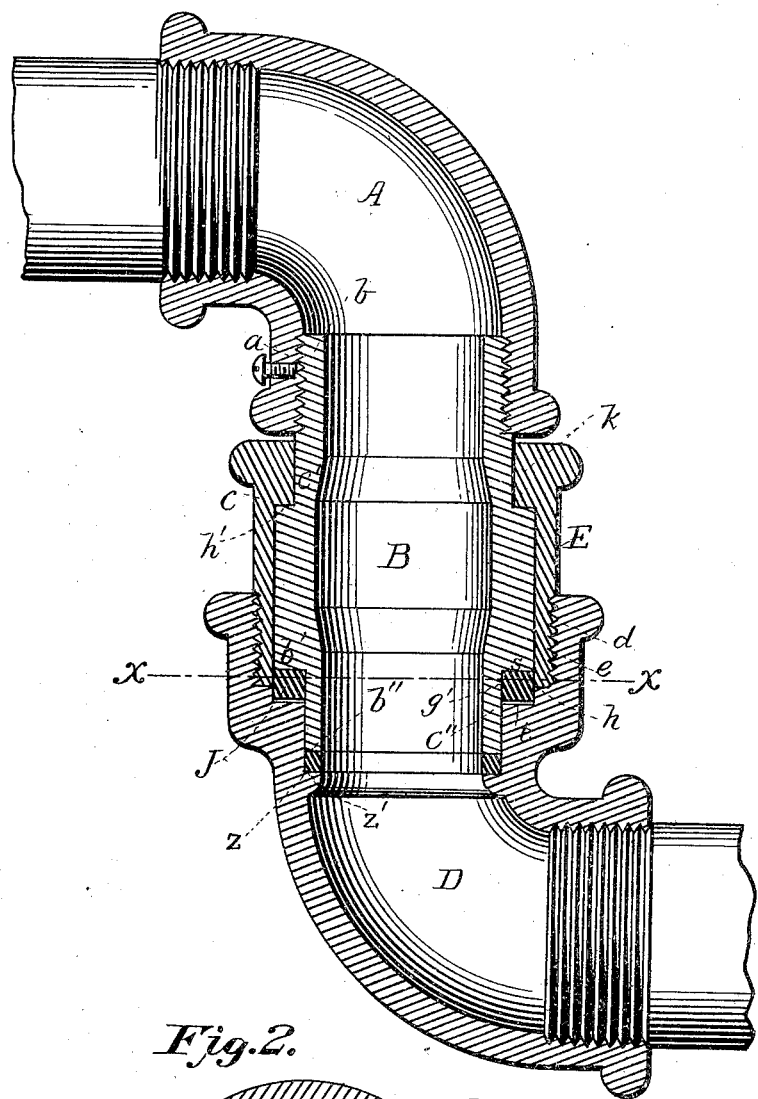
Figure 2:
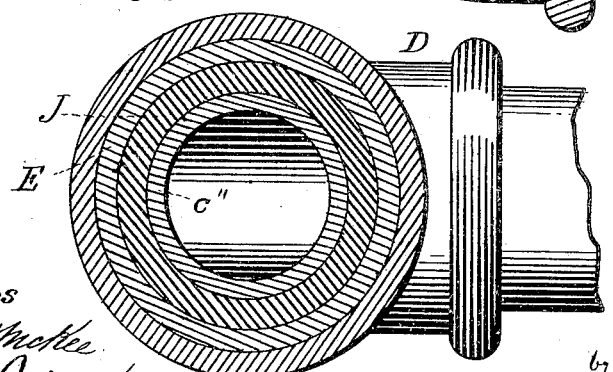

Figure 1 is a longitudinal section through my joint. Fig. 2 is a section on the line $x\ x$, Fig. 1.

The invention has relation to swivel-joints for piping designed more particularly for use where steam-tight joints are required; and it consists in the novel construction and combinations of parts, as hereinafter set forth.

In the accompanying drawings the letter A designates a joint or coupling-piece of pipe having its end threaded at $a$ to receive the threaded end $b$ of the pivotal section B, which is formed with an exterior annular shoulder $c$, facing its threaded end, which is rabbeted beyond said shoulder, as at $c'$, to form a neck. This section is also rabbeted at its other end, forming a gasket-shoulder $b'$, and may have an end bearing $b''$ for a gasket, or both gasket-bearings may be used.

The letter D indicates a joint or coupling-piece of pipe which is designed to be connected to the joint or coupling-piece A by the swivel-joint, and to this end is threaded at $d$ for connection with the threaded end $e$ of the section E, which is designed to turn on the pivotal section B, or the pivotal section may be arranged to turn within the socket-section. The portions D and E form a socket-section. The socket-section is enlarged at its threaded portion to form an annular chamber $g'$, which extends to the shoulder $h$ of said socket-section, said shoulder being internal and facing the threaded end of the socket-section. At the other end of the socket-section an annular increment is provided at $k$, which terminates in an interior shoulder $h'$. When the sections are put together, the shoulders $c$ and $h'$ engage, the annular increment $k$ of the socket-section engaging the rabbet $c'$ of the pivotal section A, or to reduce friction steel ball-bearings may be used between the shoulders $c$ and $h$.

The exterior and interior cylindrical faces, respectively, of the pivotal section and socket-section are in revoluble contact, and the inclosed or gasket end of the pivotal section forms the annular bearing face or wall of the chamber $g'$, in which is placed the rubber gasket J, said gasket spanning and closing the joint-crevice between the metallic parts, where one moves on the other. It also closes the abutting thread-joint. In placing this gasket it is arranged against the face or wall of the chamber $g'$ at the inclosed end of the pivotal section. The face of the gasket which is pressed by the action of steam or air against the wall of said chamber is indicated at $s$, and its opposite face, which is shown at $t$, is when the end gasket is not used exposed to allow the steam or other pressure to hold said gasket up to its bearing against that face or wall of the chamber which is divided by the crevice at the end of the bearing-surfaces or surfaces which move one upon the other. The gasket or packing-ring J is placed against the inclosed or free end of the pivotal section and located in juxtaposition to an internal shoulder, thereby receiving almost all the steam or air pressure and avoiding the undue wear which would result from the employment of an external shoulder against an inner cylindrical bearing-surface. This joint is therefore regarded as one which will be lasting as well as effective, for the reason that the gasket is not borne upon by opposite metallic pressure-bearings or arranged to carry weight or otherwise exposed to unnecessary wearing pressure.

When the packing ring or gasket is to be replaced, it is only necessary to unscrew the socket-section, which is usually provided with surface-ribs or other devices for engagement with a suitable wrench.

The pivotal section is made long by means of the extended internal bearing $c''$, so that it will have pivotal bearings both at $c'$ and $c''$, thus avoiding all rocking of this part of the coupling apt to occur in constant use when the joint is short.

When an end gasket is used, it is placed at the end of the pivotal section, as indicated at $z$, said gasket being arranged between said end and a shoulder $z'$ of the piping, the entire inner peripheral surface of said gasket $z$ being exposed to pressure.

Gaskets of square cross-section or cup form may be used, the cup form being preferred for water-joints.

Having described this invention, what I claim, and desire to secure by Letters Patent, is—

1. In a pipe-joint, the end section and the middle section connected to and separable from each other, and having an annular chamber or enlargement shouldered at each end thereof, the pivotal section having a rib thereon engaging said recess, and a packing-ring between the inner end of said rib and the inner shoulder of said enlargement, and having its outer peripheral face spanning the joint between said end and middle sections, substantially as specified.

2. In a pipe-joint, the end section and the middle section connected to and separable from each other, and having an annular chamber or enlargement provided with a shoulder at each end thereof, the pivotal section having a rib thereon engaging said recess, a packing-ring between the inner end of said rib and the inner shoulder of said enlargement, and having its outer peripheral face spanning the joint between said end and middle sections, and a packing-ring between the inner extremity of said pivotal section and a shoulder of the end section, and having its inner peripheral face entirely exposed to pressure, substantially as specified.

3. In a pipe-joint, the end section having an annular internal enlargement or chamber terminating in a shoulder at its inner end, the middle section having a similar enlargement terminating in a shoulder at its inner end, and having a screw-threaded engagement with said end section, said sections having a space between said shoulders forming an internal cylindrical chamber, the pivotal section having a cylindrical rib thereon, engaging said cylindrical chamber, and having oppositely-facing shoulders located in juxtaposition to the shoulders of said end and middle sections, the packing-ring located between the inner of said shoulders, and the end section connected to said pivotal section, substantially as specified.

4. In a pipe-joint, the end section having an annular internal enlargement or chamber terminating in a shoulder at its inner end, the middle section having a similar enlargement terminating in a shoulder at its inner end, and separably connected to said end section, but revoluble therewith, the space between said shoulders forming an internal cylindrical chamber, the pivotal section having a cylindrical rib thereon engaging said cylindrical chamber and having oppositely-facing shoulders located in juxtaposition to the shoulders of said end and middle sections, and revoluble with relation thereto, said pivotal section having cylindrical necks or reduced extensions upon both sides of the rib thereof, and engaging cylindrical bearing-surfaces of said end and middle sections, one of said necks or extensions terminating in an annular shoulder, said end section having an annular shoulder facing the shoulder of said neck, the packing-ring located between the inner shoulder of said middle section, and the shoulder of said end section, and spanning the screw-joint between such sections, the packing-ring located between the facing-shoulders of said neck and end section, and the end section having a screw-threaded connection with said pivotal section, substantially as specified.

In testimony whereof I affix my signature in presence of two witnesses.

THOS. W. MORAN.

Witnesses:
HERBERT C. EMERY,
GEORGE M. ANDERSON.